United States Patent [19]
Wallace et al.

[11] Patent Number: 6,081,695
[45] Date of Patent: Jun. 27, 2000

[54] HOLSTER FOR A PAGER OR CELLULAR PHONE

[75] Inventors: Stanley B. Wallace, 8520 Side Saddle Ct., Randallstown, Md. 21133; Dennis Wayne Amell, Baltimore, Md.

[73] Assignee: Stanley B. Wallace, Randallstown, Md.

[21] Appl. No.: 09/169,387

[22] Filed: Oct. 9, 1998

[51] Int. Cl.[7] .......................... H04B 01/034; H04B 01/08
[52] U.S. Cl. ..................... 455/90; 455/575; 455/351; 455/100; 24/3.11; 24/3.12
[58] Field of Search ........................ 455/90, 38.4, 575, 455/550, 556, 100, 128, 38.1, 346, 347, 348, 349, 351; 340/825.44; 24/3.11, 3.12, 573.1, 3.1; 224/665, 666, 667, 668, 197, 269, 240, 929, 930

[56] References Cited

U.S. PATENT DOCUMENTS

| | | | |
|---|---|---|---|
| 3,937,373 | 2/1976 | Artz | 224/26 |
| 4,157,166 | 6/1979 | Voelker | 248/317 |
| 4,389,806 | 6/1983 | Herring | 43/57.1 |
| 4,605,335 | 8/1986 | Otrusina | 24/3.12 X |
| 5,488,759 | 2/1996 | Lim et al. | 455/348 X |

FOREIGN PATENT DOCUMENTS

2258489  2/1993  United Kingdom.

*Primary Examiner*—Fan Tsang
*Assistant Examiner*—Philip J. Sobutka
*Attorney, Agent, or Firm*—Leonard Bloom

[57] ABSTRACT

A holster for a pager has a main body portion and further has a loop for receiving the end of the user's belt therethrough. The main body portion of the holster has a pair of spaced-apart openings including a first (upper) opening and a second (lower) opening, the latter being formed as a slot. The belt clip of a pager is received in the upper opening, and an inturned end of the pager's belt clip is received in the lower opening (preferably with a slight interference fit) to preclude an inadvertent dislodgement of the pager. The holster also accommodates a cell phone.

12 Claims, 9 Drawing Sheets

HOLSTER FOR A PAGER OR CELLULAR PHONE

FIELD OF THE INVENTION

The present invention relates to a holster carried on the belt of a user, and more particularly, a holster for conveniently carrying a pager or a cell phone.

BACKGROUND OF THE INVENTION

Pagers, as well as cell phones, have been in widespread use for many years and have become ubiquitous in modern society and throughout the world.

Most men, and some women, carry the pager or cell phone on their belt. When paged, or when the cell phone rings, the user lifts the pager or cell phone off of his or her belt; then subsequently re-inserts the pager or cell phone. This procedure is often awkward and inconvenient.

Moreover, and especially in the case of a cell phone, and even though the antenna is retracted, the cell phone tends to jab into the user's ribs. When seated, the user usually takes the pager or cell phone off of his or her belt, and thus the instrument can be lost or misplaced.

While the use of a holster for guns and for various implements and tools is well known, no one has yet to come up with a practical, efficient, low-cost and attractive holster for a pager or cell phone.

BRIEF SUMMARY OF THE INVENTION

Accordingly, it is the primary object of the present invention to fulfill a long-felt need by providing a practical, efficient, low-cost and attractive holster for a pager or cell phone.

In accordance with the teachings of the present invention, there is herein provided a holster for a pager, wherein the pager has a belt clip for removably mounting the pager to the user's belt, and wherein the belt clip has an end portion provided with an inturned tab normally engaging the lower edge of the user's belt. The holster includes a loop for receiving the user's belt, such that the belt may be threaded through the loop for suspending the holster from the user's belt. The holster further includes a main body portion depending from the loop. This main body portion has a pair of openings, including a first opening through which the belt clip of the pager may be threaded, thereby supporting the pager on the holster, and further including a second opening, below the first opening and spaced therefrom, for receiving the inturned tab on the belt clip, thereby precluding against inadvertent dislodgement of the pager from the holster.

In a preferred embodiment, the holster comprises a strap folded back upon itself to form the loop and the main body portion of the holster, respectively. The main body portion is secured by respective fastening means disposed above the first opening and below the second opening, respectively.

Preferably, the strap comprises a leather strap, and the fastening means comprises respective rivets. In the preferred embodiment, there are four rivets; two rivets are disposed adjacent to the first opening and on either side thereof, and two rivets are disposed adjacent to the second opening and on either side thereof.

The first opening is larger than the second opening and comprises a substantially rectangular opening, and the second opening comprises a slot.

The holster of the present invention will also accommodate the belt clip of a cellular phone, in which case the belt clip of the cellular phone is disposed only in the first opening in the holster.

Viewed in another aspect, the present invention provides a method of using a pager or a cellular phone more efficiently, including the step of providing a holster, the holster having a loop and further having a main body portion depending from the loop, and the main body portion having at least one opening formed therein. A pager or a cellular phone is provided, each of which has a belt clip. The belt clip of the pager or cellular phone is inserted into the opening in the main body portion of the holster, such that the pager or cellular phone is carried in the holster. The user's belt is subsequently threaded through the loop on the holster, such that the holster is supported on the user's belt. When receiving a page, the holster is tilted upwardly (as may be necessary) to see the screen on the pager; and it is not necessary to remove the pager from the holster. Moreover, if a cellular phone is carried on the holster, the cellular phone is lifted out of the holster when receiving a call, then subsequently re-inserted into the holster.

These and other objects of the present invention will become apparent from a reading of the following specification taken in conjunction with the enclosed drawings.

GENERAL DESCRIPTION OF THE PREFERRED EMBODIMENTS

With reference to FIGS. 1–4, there is illustrated pictorially a holster 10 constituting the preferred embodiment of the present invention.

Figure 5:
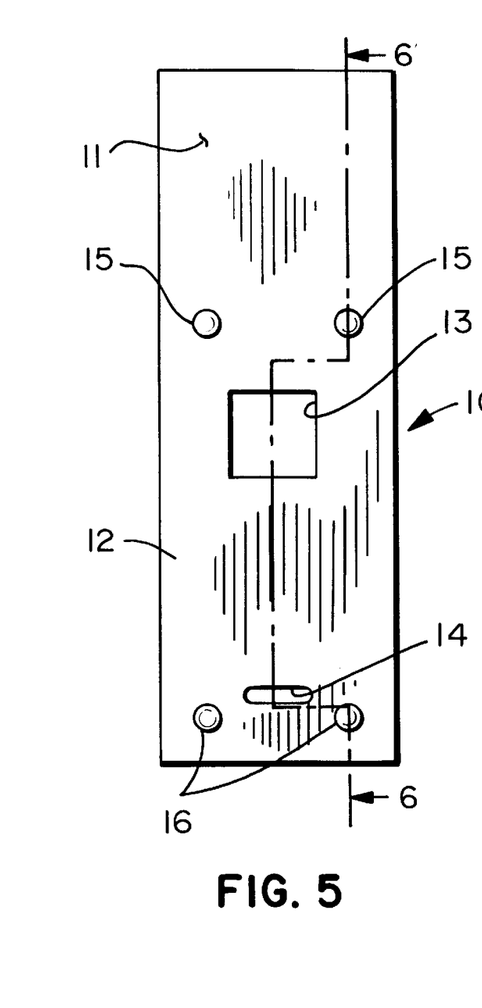
FIG. 5 is a plan view of the preferred embodiment of the holster of the present invention.
Figure 6:
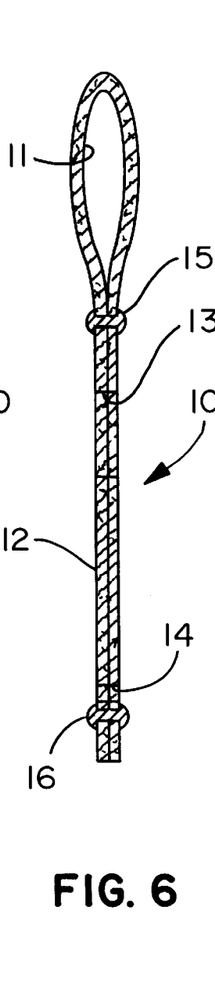
FIG. 6 is a longitudinal stepped cross-sectional view thereof, taken along the lines 6—6 of FIG. 5.

With further reference to FIGS. 5 and 6, the holster 10 is made from a strap of leather, plastic or other suitable material; and the strap is folded back upon itself to form a loop 11 integral with a main body portion 12. The main body portion 12 of the holster 10 has a pair of openings including a first (upper) opening 13 and a second (lower) opening 14. Preferably, the first opening 13 is square or substantially rectangular, and the second opening 14 is smaller than the first opening 13 and basically constitutes a slot.

The main body portion 12 of the holster 10 is secured by suitable fastening means including a first pair of rivets 15 and a second pair of rivets 16. The rivets 15 are disposed substantially adjacent to the first opening 13 and on either side thereof, and the rivets 16 are disposed substantially adjacent to the second opening 14 and on either side thereof With reference again to FIGS. 1–4 and with further reference to FIG. 7, the holster 10 may support a pager (or "beeper") 17. The pager 17 has a belt clip 18 secured thereto, and the end of the belt clip 18 has an inturned tab 19 formed integrally therewith.

Figure 7:
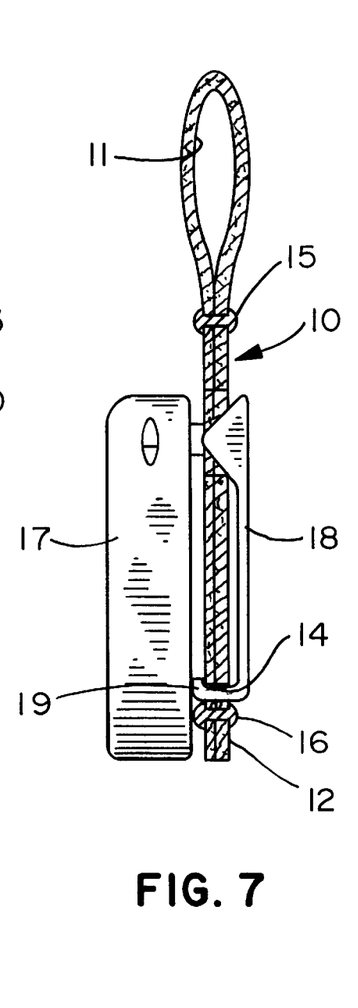
FIG. 7 is a further cross-sectional view, corresponding substantially to FIG. 6, but showing the pager mounted on the holster and locked thereon against an inadvertent dislodgement therefrom.

The belt clip 18 of the pager 17 is inserted through the first opening 13 (see FIGS. 1 and 7) to mount the pager 17 on the holster 10; and the inturned tab 19 of the pager's belt clip 18 is inserted into the second opening 14 (preferably with a slight interference fit), such that the pager 17 is substantially locked on the holster 10 and is precluded from an inadvertent dislodgement therefrom (as shown in FIG. 7).

Figure 1:
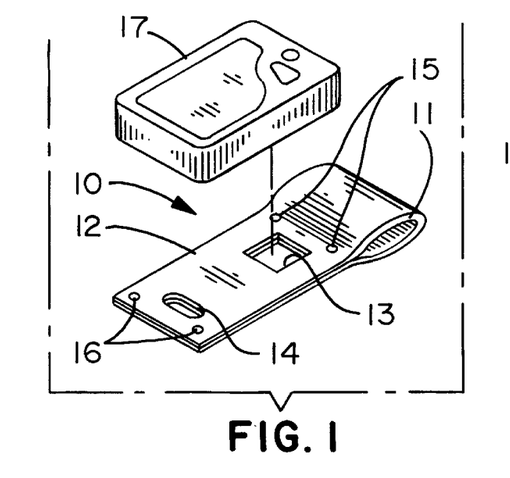
FIG. 1 is an perspective view of a preferred embodiment of the holster of the present invention shown in exploded relationship with a typical pager.
Figure 2:
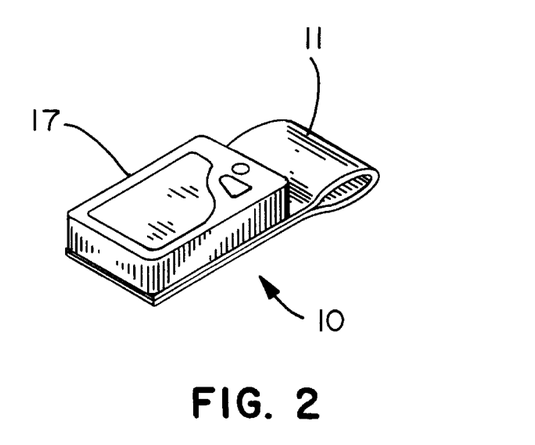
FIG. 2 is a further perspective view, corresponding substantially to FIG. 1, but showing the pager inserted into the holster.
Figures 3, 4:
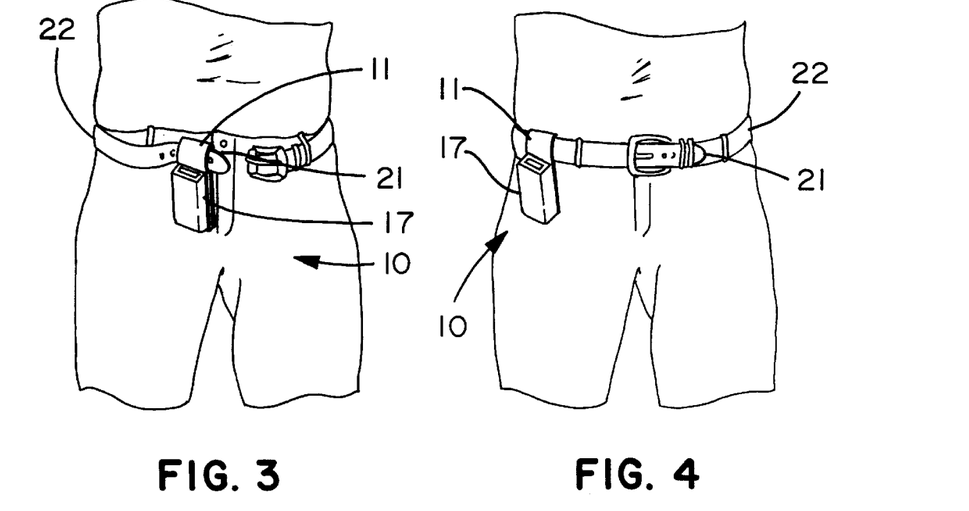
FIG. 3 is a still further perspective view, showing the user's belt loosened, and further showing the end of the user's belt being threaded into the loop of the holster, the holster carrying the pager.
FIG. 4 is another perspective view, corresponding substantially to FIG. 3, but showing the holster (with the pager mounted thereon) supported on the user's belt.

With reference again to FIGS. 2–4, once the belt clip 18 of the pager 17 is slipped into the first opening 13 and the inturned tab 19 is secured in the second opening 14 (FIGS. 2 and 7), the end 21 of the user's belt 22 is loosened (FIG. 3) and the end 21 of the user's belt 22 is slipped into the loop 11 of the holster 10 (FIG. 3). Thereafter (as shown in FIG. 4) the belt 22 is tightened.

With this arrangement, it is not necessary to remove the pager 17 from the holster 10, and when changing clothes, the holster 10 with the pager 17 mounted thereon may easily and conveniently be removed from the belt 22 and installed on another belt in just a few seconds.

Figure 9:
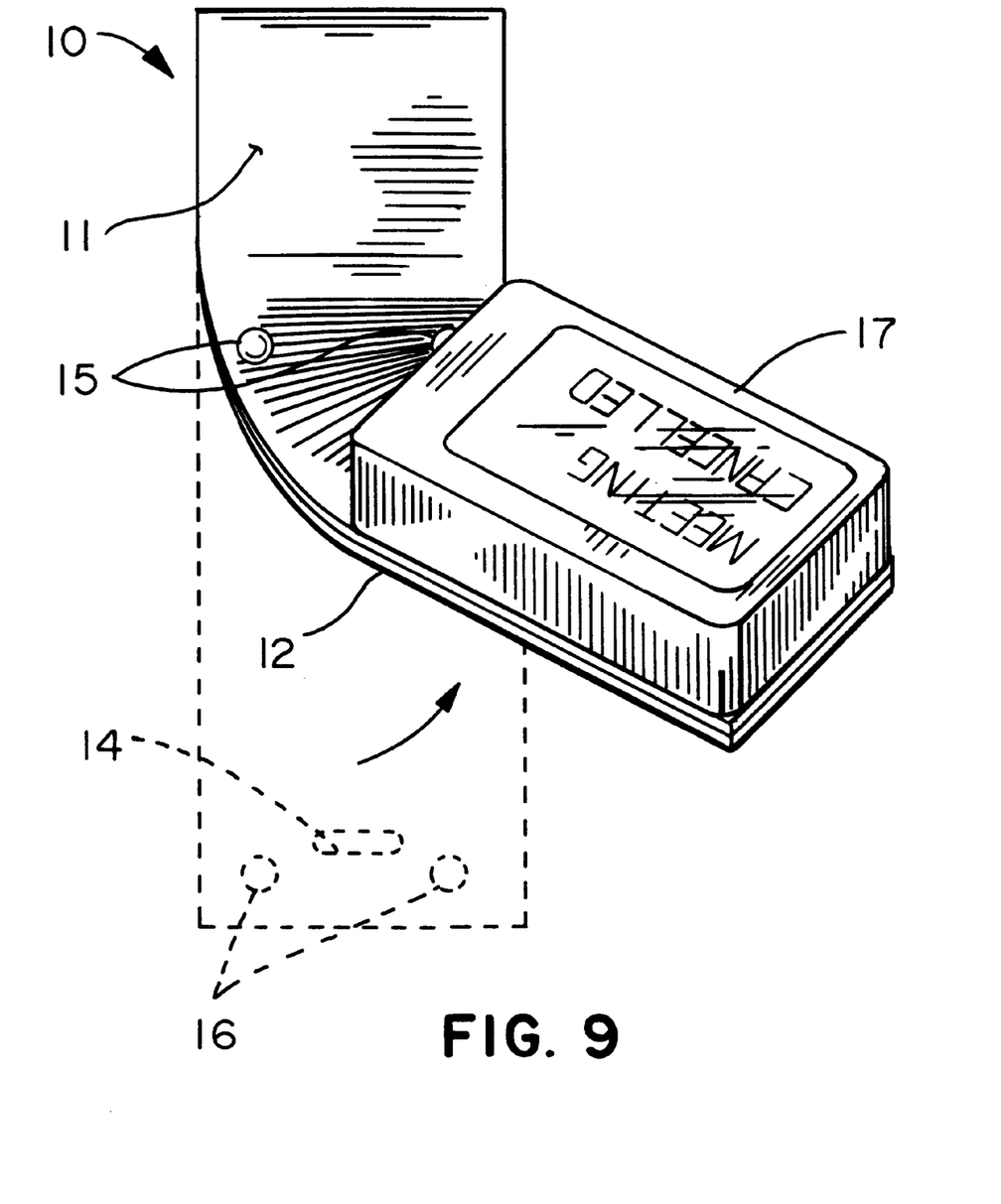
FIG. 9 is a pictorial view, showing how the message on the pager may be viewed by merely lifting up the end of the holster, and showing that it is not necessary to remove the pager from the holster.

As shown in FIG. 9, the holster 10 may be easily flipped up sufficiently to see the telephone number or other message on the pager 17. The same is true for replacing the pager's battery (not shown).

Thus, it will be appreciated that the holster 10 is indeed useful and fulfills a long-felt need. The holster 10 facilitates the use and enjoyment of the pager 17, making the pager 17 more convenient and easy to use, without interfering with the user's comfort in carrying the pager 17. Moreover, the holster 10 may be made economically from sturdy readily-available materials for widespread marketing and distribution.

Moreover, the holster 10 lends itself to the "good/better/best" concept of consumer marketing. For example, a standard model of the holster 10 may be made of a suitable plastic material (and in different colors); a "step-up" model may be made of leather (and of different patterns); and an ultra deluxe model may be made of snakeskin or alligator skin and monogrammed.

These are substantial features and advantages, heretofore not available in the prior art.

Figure 8:
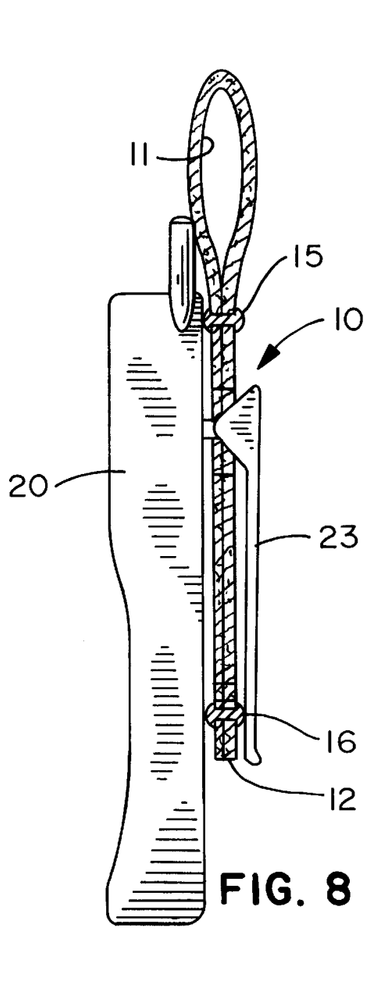
FIG. 8 is a still further cross-sectional view, corresponding substantially to FIG. 7, but showing a cellular phone ("cell" phone) mounted on the holster.

Moreover, and with references to FIG. 8, the same holster 10 may also be used to carry a cell phone 20. The cell phone 20 has an elongated belt clip 23 which is threaded through the first opening 13.

Figure 10:
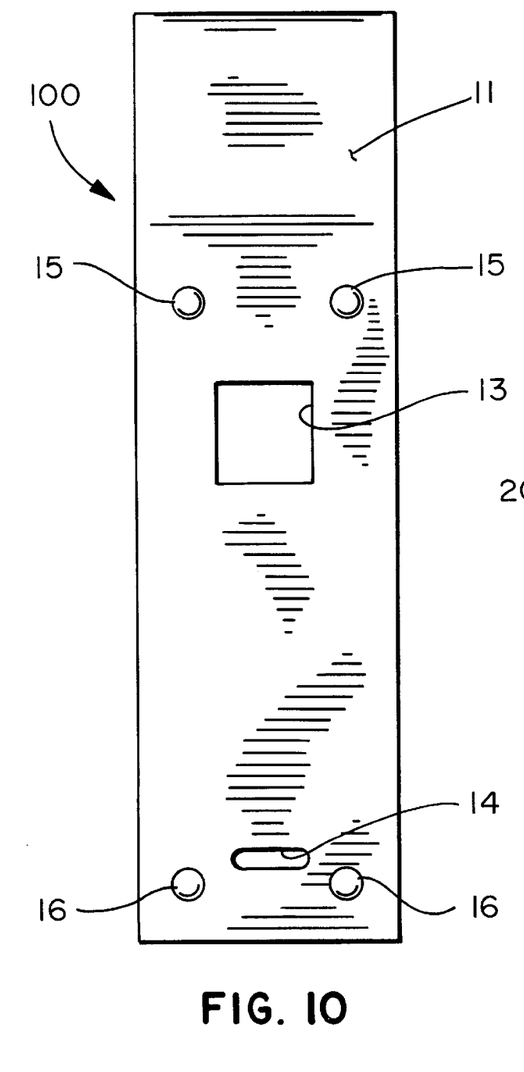
FIG. 10 is a plan view of a slight modification of FIG. 1, constituting a second embodiment, wherein the holster is somewhat longer to better accommodate a cell phone.
Figure 12:
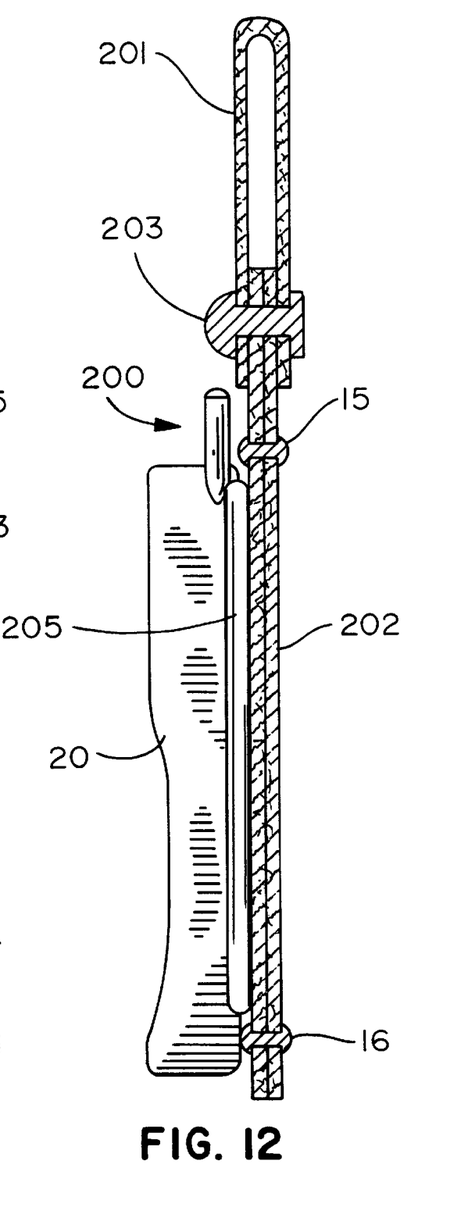
FIG. 12 is a longitudinal, stepped cross-sectional view thereof, taken along the lines 12—12 of FIG. 11.

With reference to FIGS. 10 and 12, a second embodiment of the present invention is shown. There, the holster 100 is substantially identical to the holster 10 of the FIGS. 1–9 preferred embodiment, but is made longer (as shown) to more readily accommodate the cell phone 20.

Figure 11:
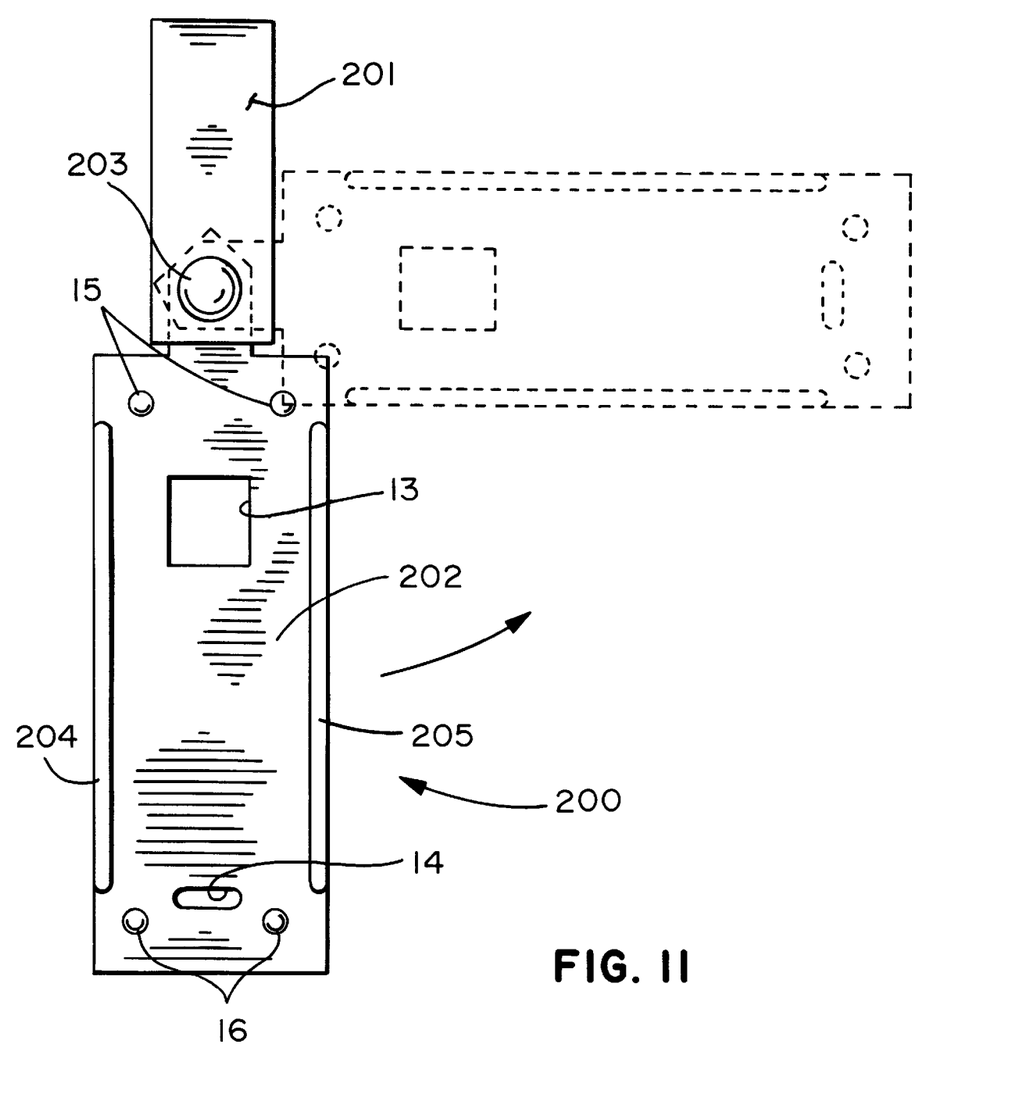
FIG. 11 is a plan view of a third embodiment of the present invention, one intended more specifically for cell phones, wherein the main body portion of the holster is pivotably mounted to the loop formed on the holster.

A third embodiment of the present invention is illustrated in FIG. 11. There, the holster 200 has its loop 201 pivoted to its main body portion 202 by means of a pivot 203. The main body portion 202 of the holster 200 also has a pair of generally-parallel upstanding ribs 204 and 205, respectively, on either side of the main body portion 202 so as to cradle the cell phone 20.

Figure 13:
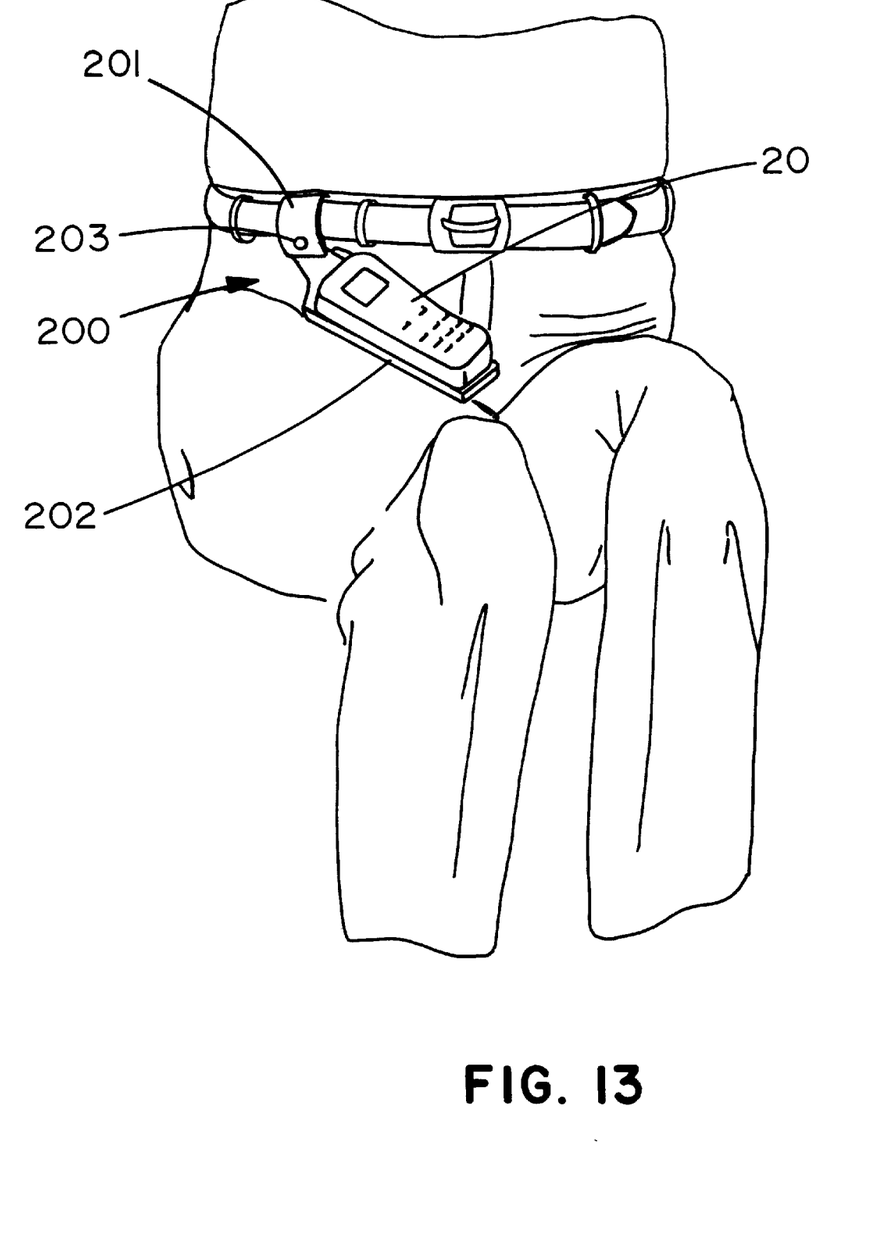
FIG. 13 is a pictorial view, showing how the embodiment of FIGS. 11 and 12 may be used while the user is seated, such that it is not necessary to remove the cell phone from the holster.

As shown in FIG. 13, the cell phone 20 rests comfortably on the user's or wearer's lap (as, for example, when the wearer is driving) and the main body portion 202 of the holster 200 will simply pivot with respect to the loop 201 so that the holster 200 is, in a sense, "self adjusting" for maximum convenience and comfort to the wearer.

Figure 14:
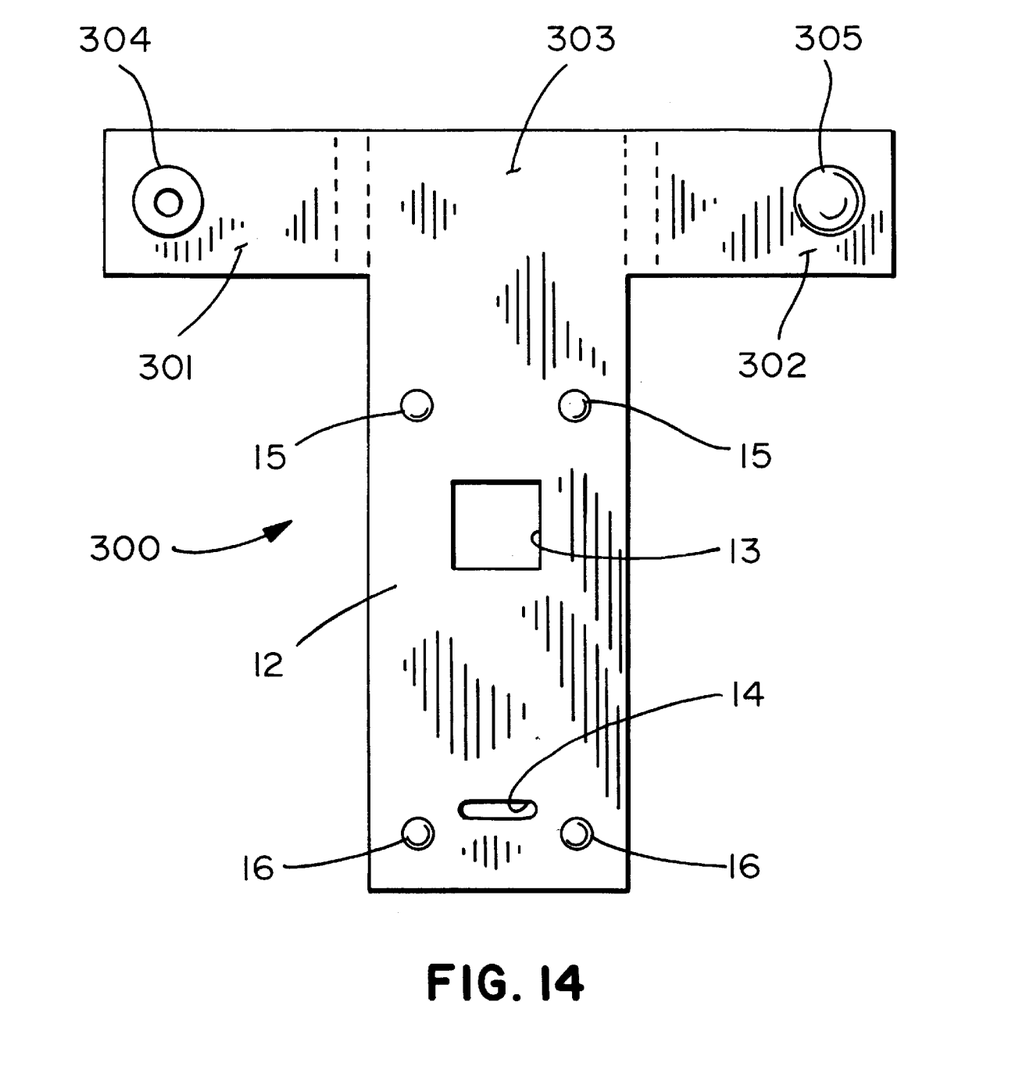
FIG. 14 is a plan view of a fourth embodiment of the present invention, wherein a pair of extended ears are provided on either side of the loop formed on the holster, the ears being provided with respective snaps, such that the ears may be locked over a belt loop (in the event the user is wearing suspenders instead of a belt).
Figure 15:
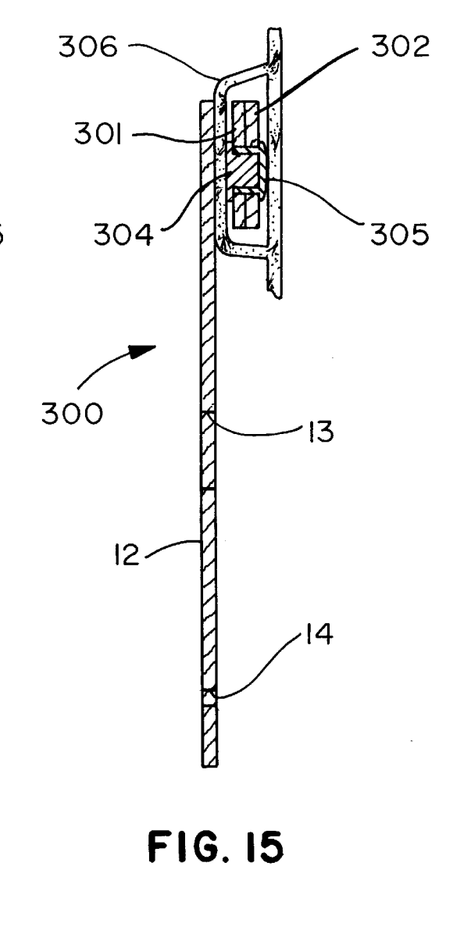
FIG. 15 is a cross sectional view taken along the lines 15—15 of FIG. 16.
Figure 16:
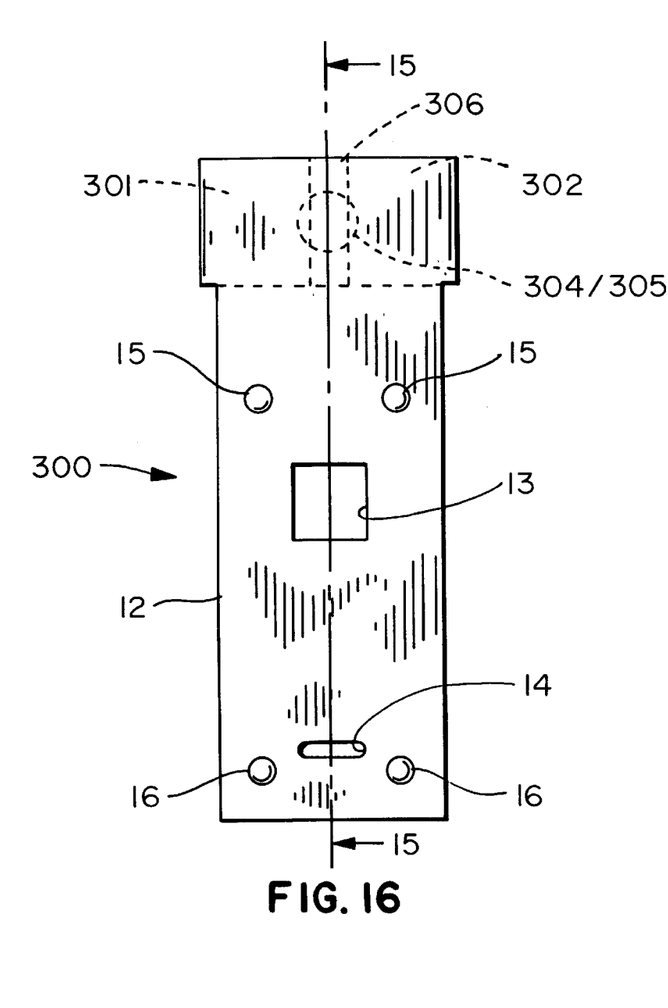
FIG. 16 is a further plan view thereof, corresponding substantially to FIG. 14, but showing the snaps fastened together around the belt loop.

With reference to FIGS. 14–16, a fourth embodiment of the present invention is illustrated. There, the holster 300 has respective extended ears 301 and 302, respectively, on either side of the holster's loop 303. The ears 301 and 302 are provided with cooperating snaps 304 and 305, respectively, to bracket a belt loop 306 on the user's belt 307 and substantially "lock" the holster 300 to the user's belt 307 (within certain limits). Other suitable fastening means, such as "VELCRO" hook-and-loop fasteners, may also be employed.

Figure 17:
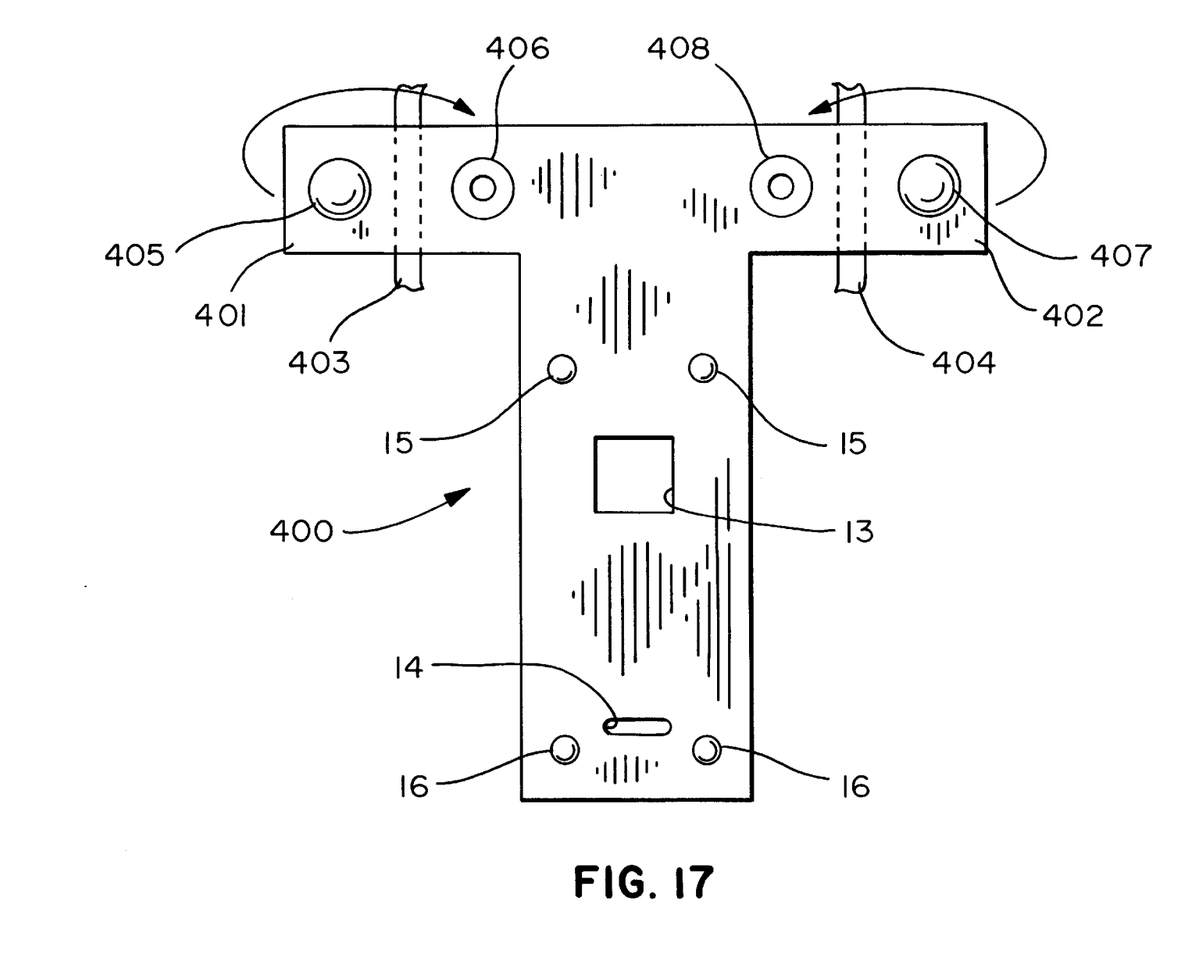
FIG. 17 is a plan view of a fifth embodiment, wherein each extended ear snaps over a respective loop on the wearer's pants (in the event suspenders are used instead of a belt).

With reference to FIG. 17, a fifth embodiment of the present invention is illustrated. There, the holster 400 has ears 401 and 402, respectively, each of which snaps over a belt loop 403 and 404, respectively, on the user's pants. Ear 401 has cooperating snaps 405 and 406, respectively, while ear 402 has cooperating snaps 407 and 408, respectively. This arrangement provides a secure mounting of the holster 400, particularly where the user has suspenders instead of a belt.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A holster for a pager, wherein the pager has a belt clip for removably mounting the pager to the user's belt, the belt clip having an end portion provided with an inturned tab normally engaging the lower edge of the user's belt, the holster comprising a loop for receiving the user's belt, such that the belt may be threaded through the loop for suspending the holster from the user's belt, the holster further comprising a main body portion depending from the loop, the main body portion having a pair of openings, including a first opening through which the belt clip of the pager may be threaded, thereby supporting the pager on the holster, and further including a second opening, below the first opening and spaced therefrom, for receiving the inturned tab on the belt clip, thereby precluding against inadvertent dislodgement of the pager from the holster.

2. The holster of claim 1, wherein the holster comprises a strap folded back upon itself to form the loop and the main body portion of the holster, respectively, the main body portion being secured, respectively, by respective fastening means disposed above the first opening and below the second opening.

3. The holster of claim 2, wherein the strap comprises a leather strap.

4. The holster of claim 2, wherein the fastening means comprises respective rivets.

5. The holster of claim 4, wherein there are four rivets, two rivets being disposed adjacent to the first opening and on either side thereof, and two rivets being disposed adjacent to the second opening and on either side thereof.

6. The holster of claim 1, wherein the first opening is larger than the second opening and comprises a substantially rectangular opening, and wherein the second opening comprises a slot.

7. The holster of claim 1, wherein the main body portion of the holster is pivotably mounted to the loop on the holster.

8. The holster of claim 1, wherein the loop on the holster has extended ears, one on each side of the loop, and wherein the ears are provided with cooperating fastening means, such that the ears may be secured around a belt loop on the user's belt.

9. The holster of claim 8, wherein the cooperating fastening means comprises cooperating snaps.

10. A holster for a pager, wherein the pager has a belt clip for removably mounting the pager to the user's belt, the belt clip having an end portion provided with an inturned tab normally engaging the lower edge of the user's belt, the holster comprising a strap folded back upon itself to form a loop for receiving the user's belt, such that the belt may be threaded through the loop for suspending the holster from the user's belt, the strap being secured to itself below the loop by respective rivets to form a main body portion of the holster, the main body portion having a pair of openings, including a first substantially rectangular opening through which the belt clip of the pager may be threaded, thereby supporting the pager on the holster, and further including a second opening comprising a slot disposed below the first opening and spaced therefrom for receiving the inturned tab on the belt clip, thereby locking the pager to the holster and precluding against inadvertent dislodgement of the pager from the holster, and wherein there are four rivets, two rivets being disposed adjacent to the first opening and on either side thereof, and two rivets being disposed adjacent to the second opening and on either side thereof.

11. The holster of claim 10, wherein the holster will also accommodate the belt clip of a cellular phone, the belt clip of the cellular phone being disposed only in the first opening in the holster.

12. The method of using a pager or a cellular phone more efficiently, comprising the steps of providing a holster, the holster having a loop and further having a main body portion depending from the loop and having at least one opening formed therein, providing a pager or a cellular phone, each of which has a belt clip, inserting the belt clip of the pager or cellular phone into the opening in the main body portion of the holster, such that the pager or cellular phone is carried in the holster, subsequently threading the user's belt through the loop on the holster, such that the holster is supported on the user's belt; wherein, when receiving a page, tilting the holster upwardly, as necessary, to see the screen on the pager without being required to remove the pager from the holster; and wherein, when receiving a call on the cellular phone, lifting the cellular phone out of the holster.

\* \* \* \* \*